United States Patent

[11] 3,584,639

[72] Inventors Jury Nikolaevich Potepalov;
  Evgeny Vasiljevich Grechkovsky; Evgeny Georgievich Sonkin; Robert Jurjevich Fedoseev, all of Moscow, U.S.S.R.
[21] Appl. No. 463,472
[22] Filed June 8, 1965
[45] Patented June 15, 1971
[73] Assignee Gasudarstuenny Nauchno Issledovatelsky Institute Organicheskikh polvproduktov i Krasitelei
  Moscow, U.S.S.R.

[54] DISCRETE-OPERATING PNEUMATIC ELEMENT FOR LOGICAL FUNCTION
  3 Claims, 4 Drawing Figs.
[52] U.S. Cl. .................................................. 137/111,
  137/528, 137/81.5, 137/525, 235/201, 251/331
[51] Int. Cl. ................................................ F16k 15/04,
  G05d 11/00
[50] Field of Search .......................................... 137/81.5,
  925, 111, 112, 114, 608, 528; 251/331 D; 235/201 ME

[56] References Cited
  UNITED STATES PATENTS
| | | | |
|---|---|---|---|
| 1,226,796 | 5/1917 | Newcombe | 137/111 |
| 2,533,965 | 12/1950 | Schmol | 417/560 |
| 2,614,793 | 10/1952 | Storm | 137/525 |
| 2,657,708 | 11/1953 | Kamm | 137/512.1 |
| 3,247,866 | 4/1966 | Sanz | 137/533 |
| 3,252,481 | 5/1966 | Meier | 137/625.4 |
| 3,318,329 | 5/1967 | Norwood | 137/599 |
| 1,302,538 | 5/1919 | Gulick | 137/413 |

OTHER REFERENCES

"Universal Modular System For Pneumatic Switching Controls," Abstracted By L. A. Steiner in PROCESS CONTROL AND AUTOMATION. July 1964 Vol. 11 No. 7.

IBM TECHNICAL DISCLOSURE BULLETIN, "Pneumatic Diode," D. J. Truslove, Vol. 6, No. 3, Aug. 1963, P. 30

IBM TECHNICAL DISCLOSURE BULLETIN, Shift Register etc., R. E. Norwood et al., Vol. 7, No. 4, Sept. 1964, pp. 297— 299

INSTRUMENTS & CONTROL SYSTEMS, "Pneumatic Digital Computer," H. E. Riordan, Vol. 34, July 1961, pp. 1260— 1261

Primary Examiner—William F. O'Dea
Assistant Examiner—Dennis H. Lambert
Attorney—Waters, Roditi, Schwartz & Nissen ABSTRACT: A pneumatic discrete-operating device for carrying out logical functions in which a diaphragm is freely displaceable in a chamber between an inlet orifice for the delivery of a control airflow into the chamber and a control orifice coupled to an air pressure source for passing a controllable airflow to an outlet orifice through the chamber. The diaphragm is freely displaceable in the chamber under the pressure of the air at the inlet and control orifices.

DISCRETE-OPERATING PNEUMATIC ELEMENT FOR LOGICAL FUNCTION

This invention relates to computing devices designed to control different manufacturing processes, and more particularly, to discrete-operating pneumatic elements for carrying out all kinds of logical functions.

Known are several types of pneumatic elements such as diaphragm-, ball- and jet-type elements designed to perform logical functions.

The discrete-operating pneumatic diaphragm elements consist of several chambers separated by diaphragms with rigid center portions secured thereon and coupled with each other by pins.

Pneumatic ball elements of discrete operation comprise balls freely travelling in cylindrical channels, the ends and the side surfaces of which are provided with orifices for delivery and relieving the pressure.

Operation of pneumatic jet elements is based on coaction of airflows in specially calibrated channels.

All hitherto known elements are attendant with certain essential disadvantages. The diaphragm elements, for instance, are difficult to produce and they are of bulky construction. The ball elements require a high grade of accuracy when in manufacture, while even slight wear of their surfaces in the process of operation considerably affects their reliability.

The manufacture of pneumatic jet elements is complicated as they require a great consumption of air while in operation.

Attempts have been made to eliminate the above-mentioned disadvantages, but they were of no success.

An object of the present invention is to eliminate the disadvantages mentioned before and to provide a portable pneumatic element with the aim to employ said elements in pneumatic computers and control systems.

According to the invention the above said object can be attained by a discrete-operating pneumatic element comprising a diaphragm travelling freely in a chamber under the action of airflows delivered to the chamber through orifices provided in said chamber.

Other objects and advantages of the invention will become more apparent from the following description, reference being had to the appended drawings, wherein.

Figure 1:
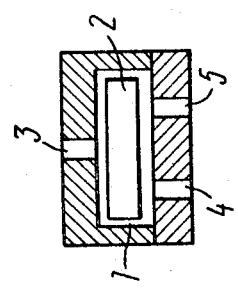
FIG. 1 is a sectional view of a discrete-operating pneumatic element for carrying out logical functions wherein the orifices for delivery and relieving the pressure are spaced at the ends of the chamber provided with a freely travelling diaphragm.

FIG. 1 illustrates a first form of a pneumatic element having a cylindrical chamber 1 wherein a freely travelling diaphragm 2 is disposed. The material of the diaphragm may be either resilient, e.g. rubber or rigid, e.g. metal. The diaphragm is made as a disc the diameter of which is a little smaller than that of cylindrical chamber 1, the thickness of the diaphragm being determined by the characteristics of the material to be used and by the height of chamber 1. At its ends the chamber is provided with orifices 3, 4 and 5. The control pressure is delivered through orifice 3, whereas through orifices 4 and 5 passes an airstream, the rate of flow thereof being controlled by said element. When the pressure of the airflow to be controlled is higher than the control pressure, diaphragm 2 will rise to the upper end of chamber 1, as a result of which the airflow to be controlled cannot pass from orifice 4 into orifice 3. At the same time the controllable flow can freely pass through chamber 1 from orifice 4 into orifice 5. If the pressure of controllable airflow is lower than the control pressure, the diaphragm, under the action of the pressure differential, will travel to the lower end of the chamber and will close orifices 4 and 5. In this case the consumption of the air to be controlled equals zero. Thus, with the help of this element the logical function OR or NOT is carried out.

Figure 2:
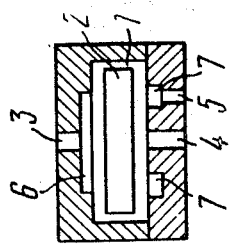
FIG. 2 is a sectional view of another embodiment of a discrete-operating pneumatic element for carrying out logical functions wherein the ends of the chamber are provided with a recess and an annular groove.

FIG. 2 illustrates another form of the discrete-operating pneumatic element wherein the shape of the orifices in the chamber are changed to some extent with the aim to increase the amplification factor. Since numerous elements in the embodiment in FIG. 2 are the same as those in FIG. 1 they will be given the same reference numerals. Control orifice 3 communicates with small recess 6 in chamber 1. Inlet orifice 4 is coaxial with chamber 1 while outlet orifice 5 is positioned in the bottom of annular groove 7 encircling inlet orifice 4.

Figure 3:
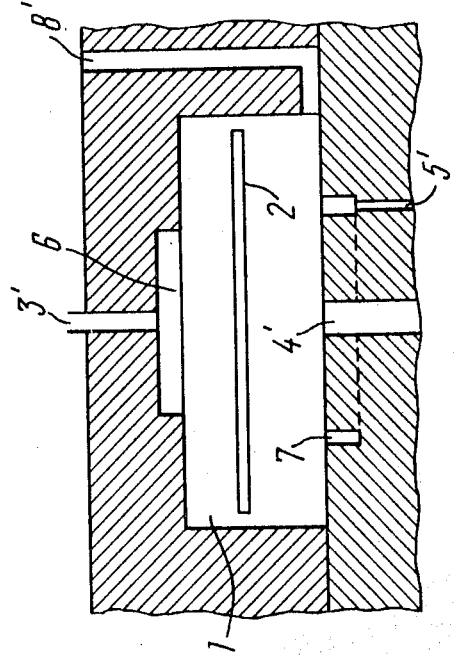
FIG. 3 is a sectional view of another embodiment of a discrete-operating pneumatic element for carrying out logical functions, wherein the chamber along with the freely lying diaphragm is provided with orifices for delivery and relieving the pressure, one of said orifices being made as a side channel and the other—as an annular groove coupled with the outlet channel.

FIG. 3 illustrates the pneumatic element, chamber 1 of which has two inlet channels $3^1$ and $4^1$, and two outlet channels $5^1$ and $8^1$. Disposed in the lower end of chamber 1 is an annular groove 7 connected with outlet channel $5^1$, said annular groove being intended to eliminate distortion of diaphragm 2 and to reduce the pressure. Inlet channel $3^1$ is connected with recess 6 provided in the upper end of chamber 1.

This element is capable of carrying out some or all logical functions of the previously described elements depending on the manner of connection of the inlet and outlet channels.

Figure 4:
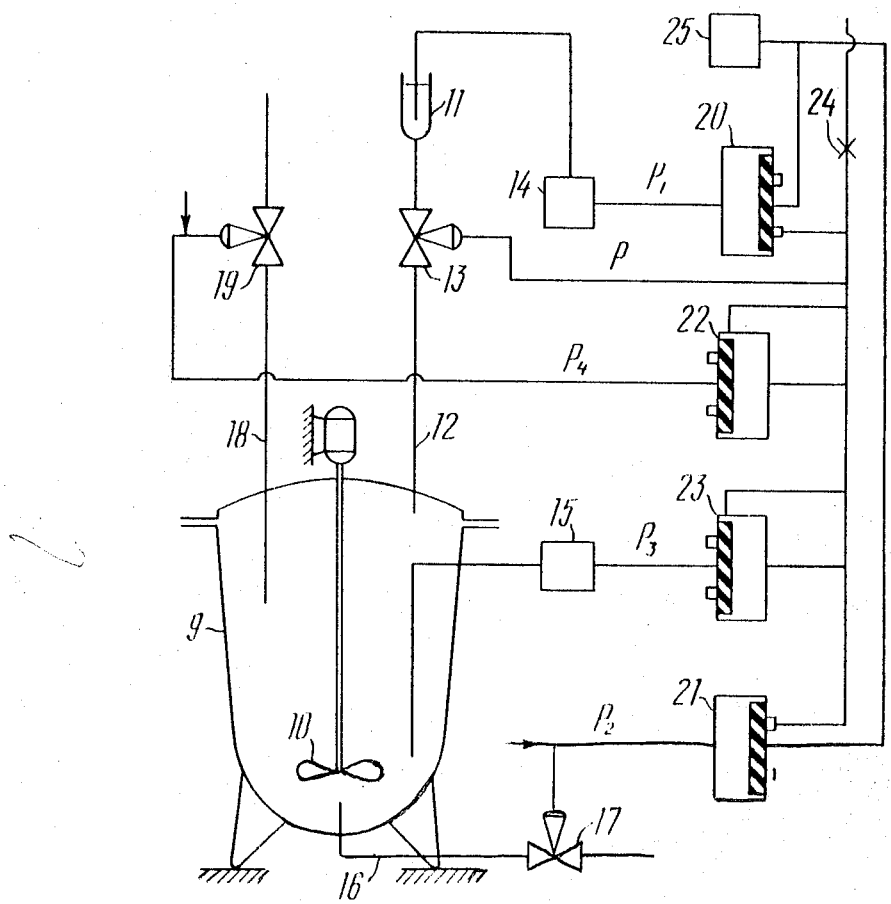
FIG. 4 is a schematic diagram showing the pouring of a reagent from a measuring tank into the apparatus, use being made of a pneumatic discrete-operating element.

The invention enables automation of various manufacturing processes. FIG. 4 is a diagram showing one of the simplest operations of a chemical process—pouring a reagent from a measuring tank into an apparatus.

Apparatus 9 with a motor-driven stirrer 10 is connected with measuring tank 11 by pipeline 12 which houses common valve 13. The level of reagent in the measuring tank is measured by means of level gauge 14 provided with an air outlet, while the level of liquid in apparatus 9 is measured by level gauge 15 which is also provided with an air outlet. Apparatus 9 is also coupled with pipeline 16 provided with stop valve 17 designed for draining off the reagent from the apparatus, and is connected with pipeline 18 provided with stop valve 19 communicating the apparatus 9 with the ambient air. The device operates following the procedure below. It is necessary to make sure that measuring tank 11 is filled to the required level (pressure $P_1$ at the outlet of level gauge 14 is 1 atm.), pipeline 16 serving to drain off the reagent is closed by valve 17 (pressure $P_2$ in the cone of valve 17 is 1 atm.), apparatus 9 is empty (pressure $P_3$ at the outlet of level gauge 15 is zero), and that the apparatus 9 communicates with the ambient air (pressure $P_4$ in the cone of valve 19 is zero). In these conditions valve 13 serving to drain off the reagent is opened to change the pressure in the cone of valve 13 from 1 to 0 atm. After operation is over (the outlet pressure of level gauge 15 $P_3$ has changed from 0 to 1 atm.) it is necessary to close valve 13 again.

These operations may be controlled by means of a device employing the discrete-operating pneumatic elements 20, 21, 22 and 23. Function NOT relative to pressures $P_1$ and $P_2$ is performed by elements 20 and 21. Simultaneously, the same elements 20 and 21 along with elements 22 and 23 and together with diodes being switched on and throttle valve 24 perform the function OR relative to pressures $\bar{P}_1$, $\bar{P}_2$, $P_3$ and $P_4$. Pressure $P_{outlet}$ is delivered to valve 13 which provides for discharge of the reagent from measuring tank 11 in due time.

While the present invention is described in connection with the preferred embodiment thereof, it is to be understood by those versed in the art that other changes and modifications might be adopted without departing from the spirit and scope of the invention.

These changes and modifications are considered to be falling within the scope of the present invention and the appended claims.

What we claim is:

1. A pneumatic discrete-operating device for carrying out logical functions, said device comprising a hollow body defining a chamber and having at least one inlet orifice for the delivery of a control airflow into said chamber, an outlet orifice coupled to an air pressure source for the delivery of air into said chamber at opposite ends thereof, and a diaphragm freely displaceable in said chamber and disposed between said inlet orifice and control orifice being located in said chamber at opposite ends thereof, and a diaphragm freely displaceable in said chamber and disposed between said inlet orifice and control orifice for displacement in said chamber, under the pressure of the air at said inlet and control orifices, away from the orifice with the higher pressure and toward the other orifice wither to control flow from the inlet orifice to the outlet orifice by approaching the inlet orifice and blocking flow therefrom or to move away from the inlet orifice and thus enable relatively unrestricted flow from the inlet orifice to the outlet orifice, said outlet orifice opening into the chamber at the same end at a position relative to the control orifice to be in communication therewith when the diaphragm blocks the inlet orifice whereby air may pass from the control orifice to the outer orifices, and at a position such that the diaphragm can simultaneously block the outlet and control orifices.

2. A device as claimed in claim 1, wherein said chamber has an annular groove opening thereinto, said outlet orifice opening into said groove, said chamber further having an outlet channel opening thereinto, said outlet channel being located in said chamber to be in communication with the inlet orifice when the control orifice is blocked by the diaphragm and to be in communication with the control orifice when the inlet orifice is blocked by the diaphragm.

3. A device as claimed in claim 2, wherein said outlet channel opens laterally into said chamber, and said outlet orifice and control orifice are at the same end of the chamber.